Sept. 15, 1970  W. J. SANDERS  3,529,240
AVERAGE METER FOR PROVIDING AN AVERAGE SIGNAL VALVE
Filed Nov. 17, 1966
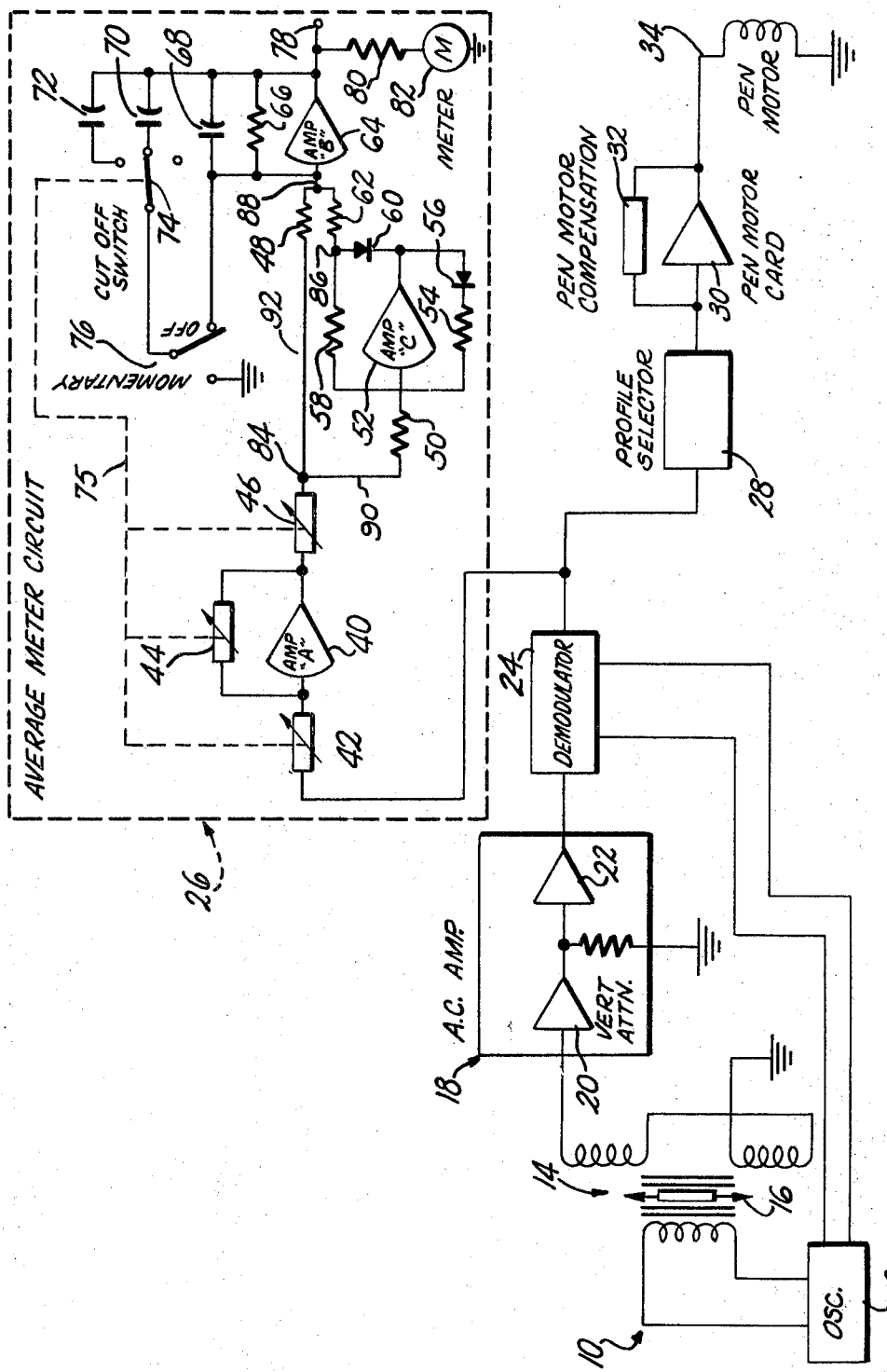
INVENTOR
WILLIAM J. SANDERS
BY *James L. O'Brien*
ATTORNEY

United States Patent Office 3,529,240
Patented Sept. 15, 1970

3,529,240
AVERAGE METER FOR PROVIDING AN AVERAGE SIGNAL VALUE
William J. Sanders, Grandville, Mich., assignor to The Bendix Corporation, a corporation of Delaware
Filed Nov. 17, 1966, Ser. No. 595,147
Int. Cl. G01b *5/28;* G01r *11/00*
U.S. Cl. 324—111          6 Claims

ABSTRACT OF THE DISCLOSURE

An average meter including a bandpass amplifier, absolute value circuit, and integrating network for converting the mechanical motion of a probe moving across the surface of a workpiece to an electrical voltage representative of the average roughness of that surface. The device herein disclosed includes a switching mechanism for selecting ranges of values to be recorded and averaged. Electrical delay in the system herein described for converting a probe motion to an average output signal is minimized by a unique, rapid read switch that minimizes the charge time of the integrating network regardless of the range of values selected to be averaged.

---

This invention relates generally to an average meter instrument and more particularly to an average meter apparatus for measuring and displaying as a meter readout, the arithmetical average roughness of a surface of a manufactured object or specimen.

Various electro-mechanical apparatus are available, such as the type described in U.S. Pat. No. 3,259,989 entitled "Method and Apparatus for Automatic Centering," filed Dec. 21, 1964, assigned to the present assignee, for producing a recording showing the profile of surfaces on manufactured objects or specimens. Such a recording will give an indication of the roughness, waviness and total profile of the surface tested, as well as the existence of any surface scratches or flaws. The equipment generally includes a tracer which contacts the peripheral surface on the specimen to be tested. The tracer unit usually comprises a probe or stylus which is connected to an electro-mechanical transducer to provide an output signal that is a measure of the departures from perfect flatness or roundness of the surface of the specimen. Low frequency fluctuations of the resulting signal produce a recording repersentative of waviness whereas high frequency fluctuations produce recordings that are representative of surface roughness.

The present invention is directed to an average meter instrument which is designed to be used with such profile recording equipment to provide a meter reading of the surface to be measured. The average meter, which operates in conjunction with profile recording equipment, provides a voltage output proportional to the arithmetic average of the amplitude of the frequency fluctuations. The meter is typically used for high frequency fluctuations, but any selected frequencies could be used. This output signal voltage will be a quantitive indication of the average surface roughness. One feature of the average meter is the provision of a cutoff selector which allows the selection of any of three cutoff positions that provides meter readings which correspond to the average roughness widths of 0.003 inch, 0.010 inch and 0.030 inch when used with a tracer traveling at a constant speed of 0.005 inch per second, but it is to be understood that any number of positions could be used and other roughness widths could be selected.

The input signal from the profiled recording equipment is a voltage analog value representing the surface profile. This signal initially contain components of both roughness and waviness. Three amplifiers are included in the average meter circuitry and include a bandpass amplifier stage, an absolute value amplifier stage and an integrator amplifier stage. The waviness component of the input signal is removed by passing it through the bandpass amplifier stage, leaving only the roughness component. The signal at this point is then an analog of the roughness component. This signal is then passed through the absolute value amplifier stage which produces a signal representative of the absolute value of the roughness component. This signal is then passed through the integrator amplifier stage which continuously integrates the signal in time over a period equal to a preselected resistance capacitance circuit. These values are determined by the desired value of the length over which the average is taken and the stylus tracing speed. The value of the output voltage from the integrator stage is then read on a meter or it is passed to further data processing or storage equipment.

Among the objects of the present invention are the provisions of an average meter to provide a voltage output and a meter readout of the arithmetical average of roughness of a surface; to provide an average meter adapted to be used in conjunction with profile recording equipment and to provide an average meter whose response means may be shortened to facilitate rapid reading of the meter so as to allow the instrument to be used on a minimum traverse length.

Other objects and further scope of applicability of the present invention will become apparent from the detailed description to follow, taken in conjunction with the accompanying drawings in which the sole figure is a block diagram of the average meter operably connected to a profile measuring and recording instrument.

Referring to the drawings, a conventional type of profile recording apparatus is shown, including a transducer head 10, an oscillator 12, a linear voltage differential transformer 14 and a tracer stylus 16. Movement of the stylus 16 changes the coupling of the transformer 14 so that the output of the oscillator 12 is modulated in the output of the transformer 14 in accordance with the surface profile sensed by the stylus 16. The output of the transducer 10 is passed to an AC amplifier stage 18 including amplifiers 20 and 22 to a demodulator section 24. The output of the demodulator 24 will be a signal, the amplitude of which varies in accordance with the surface profile sensed by the stylus 16. The output of the demodulator 24 is passed to the average meter circuit 26 and to a profile selector means 28. The output of the profile selector is amplified through amplifier 30 having a gain control network 32 and is passed to a conventional pen motor 34 for movement of a recording pen (not shown) to provide a permanent record of the signal representative of the surface roughness of the specimen to be tested. The average meter circuit includes three direct coupled amplifier stages which operate similarly to a special purpose analog computer. The first stage of the average meter circuit 26 includes a bandpass amplifier 40 having an input impedance 42 comprised of an RC network, a feedback impedance 44 comprised of a bridged T network and an output impedance 46 comprised of an RC network, whose resistance value includes resistors 48 and 50. The second stage of the average meter circuit 26 is an absolute value circuit. The resistor 48 is connected in one leg of a parallel circuit. The second leg includes the resistor 50 which is connected in series with amplifier 52. In parallel with amplifier 52 are two circuit connections comprising resistor 54 and diode 56 and resistor 58 and diode 60. A resistor 62 is coupled between resistor 58 and diode 60 and coupled to resistor 48 to complete the second leg of the parallel circuit connection. The diode 60 functions to transmit only negative output signals of the amplifier 52 to the output of the absolute value circuit. Diodes 56 and 60 could be reversed should an output of opposite polarity be necessary.

The third stage of the average meter circuit 26 functions as an integrator. An amplifier 64 is connected in series with the output of the absolute value circuit. A resistance capacitance combination is connected in parallel with amplifier 64 including resistor 66 and capacitors 68, 70 and 72. A cutoff selector switch 74 is provided to change the integration duration by selectively connecting either the capacitor 70 or the capacitor 72 in parallel with the capacitor 68, thereby varying the RC timing circuit. The switch 74 is also designed, as indicated by the connection 75, to change impedance 42, 44 and 46. The sole figure indicates generally the presence of a mechanical connection between the switch 74 and the variable impedances 42, 44 and 46. Any number of specific, well known mechanical or electrical designs may be used to provide this connection. As one example, the connection can be achieved by placing four switching cams, one for the integrator stage and one for each of the impedances 42, 44 and 46, on a single rotatable shaft. A rapid read switch 76 having a ground connection is provided to permit momentary reduction of the time constant of the average meter circuit below standard values. The switch is a momentary hold type which will return to the off-normal position when it is released. The switches 74 and 76 are arranged so as to always connect the unused but selected capacitors to ground in order that they are always precharged to the output voltage. This is done when changing from rapid read to normal time constant and allows the meter to be used immediately. The output of the integrator is coupled to terminal point 78, which may be used as the input for a computer or similar recording instrument, and to a resistor 80 coupled to a grounded indicating meter 82.

The operation of the average meter may be described as follows: The input voltage signal from the demodulator 24 of the profile recording equipment is a voltage analog of the surface profile. The signal contains components of both roughness and waviness of the specimen to be tested. The waviness component is removed, leaving only the roughness profile by passing it through the amplifier 40 having the proper bandpass characteristics, which provide a means of varying the roughness width cutoff. The bandpass amplifier 40 also provides a gain characteristic of approximately 8 to 1 which has been found to operate satisfactorily with the present circuitry.

Once the waviness has been removed through the bandpass amplifier 40, the remaining signal is the analog of the roughness profile and is designated by the letter $y$. The arithmetical average of this function is obtained by integrating the absolute value $|y|$ representing the roughness profile according to the following equation:

$$Y = \frac{1}{l} \int_0^l |y| dx$$

where $Y$ is the arithmetical average deviation from a given center line and $l$ is the length over which the average is taken. To obtain the absolute value $|y|$, the signal $y$ from the bandpass amplifier stage is passed to the absolute value stage.

The resistors 50 and 58 are selected so that the gain of the negative portion of the signal between node 84 and 86 is unity. The amplifier 52 inverts the applied input signal so that when $y$ is positive the output of the amplifier 52 will be negative and vice versa. A negative output signal will be passed to the node 86, but when the output signal of the amplifier 52 is positive, the signal voltage at node 86 will be zero because diode 60 is back biased and passes no voltage to node 86 and the voltage at the node input to amplifier 52 is zero as a result of the closed loop operation of the amplifier 52. The values of the resistors 62 and 48 are weighted so that the resistors operate to cause the current to node 88 caused by a voltage at 84 to equal ½ the current to node 88 caused by the same voltage at node 86. Accordingly, when the signal voltage $y$ at node 84 is positive, the signal voltage at node 86 will be $-y$ and the resulting signal current at node 88 will be proportiona to $\frac{1}{2}y - y = -\frac{1}{2}y$. When the signal voltage $y$ at node 84 is negative, the signal voltage at node 86 will be zero and the resulting signal current at node 88 will be proportional to $\frac{1}{2}y + 0 = \frac{1}{2}y$. Since $y$ is negative the signal voltage at node 84 will be negative and thus negative signal current proportional to the absolute value of $y$ is produced at node 88 regardless of the polarity of the signal $y$.

The absolute value signal $y$ is fed into the integrator amplifier 64. The amplifier 64 is made an integrator by adding a capacitor in parallel with the amplifier 64 and its resistor 66. The circuit then continuously integrates in time over a period proportional to the time constant provided by the resistor 66 and the capacitors 68, 70 and 72. The length over which the average is to be taken determines the value of the RC time constant to be selected. The switch 74 changes the impedances 42, 44 and 46 of bandpass amplifier 40 and the effective integrating time of amplifier 64 by switching from one value of capacitance to another. The rapid read switch 76 provides a means for removal of capacitors 70 or 72 from the RC feedback circuit thereby resulting in a shorter integration time when they are out of the circuit. The switch 76 design allows momentary activation while it is depressed or it may be locked in to keep the capacitors 70 or 72 out of the feedback circuit until the switch 76 is reactivated. The value of the integrated output voltage from the integrator stage is read on the meter 82 or it is transmitted through terminal 78 to suitable recording or other information processing equipment.

It will be appreciated that the above description is illustrative only and not limiting, and that many modifications may be made to the specific embodiment described above without departing from the spirit and scope of the invention, which is defined in the appended claims.

What is claimed is:

1. An average meter to provide a signal representing the average value of input signals received over a time interval comprising: three coupled amplifier stages including a bandpass amplifier stage to receive said input signals and provide limits to the values of said input signals that will be further processed and averaged, an absolute value stage adapted to receive either positive or negative signals from said bandpass amplifier stage and to provide an output signal of one polarity representing the absolute value of the output signal of said bandpass amplifier stage, and an integrator stage for providing an average value of said output signal received from said absolute value stage over a predetermined interval of time, said average meter also including switching means to vary the passband of the bandpass amplifier and the integration time of said integrator stage to vary said limits of the values of said input signals averaged.

2. The average meter of claim 1 wherein the absolute value stage comprises amplification means to produce an output signal proportional to the output signal of said bandpass amplifier stage but of opposite polarity, and to produce a zero output signal if the output signal of said bandpass amplifier stage is of the opposite polarity, and summing means to produce an output signal proportional to ½ the output signal of said bandpass amplifier stage plus the output of said amplification means.

3. The average meter of claim 1 wherein the integrator stage comprises an amplifier connected in parallel with a resistance and variable capacitance means, said variable capacitance means including a plurality of capcitors arranged to be selectively maintained in a parallel electrical relationship with said integrator amplifier by said switching means.

4. The average meter of claim 3 further including a second switching means independent of said first switching means to shorten the integration time of said integrator stage.

5. The combination of claim 4 in which said second switching means is arranged to switch at least one of said capacitors out of the integration time determining network of said integrator stage in a manner such that at least one of said capacitors is maintained at a preselected voltage.

6. The average meter of claim 1 wherein a dial indicator is provided to give a visual indication of the average value of the processed signals.

References Cited

UNITED STATES PATENTS

| | | | |
|---|---|---|---|
| 2,733,598 | 2/1956 | Miner | 73—105 |
| 3,087,329 | 4/1963 | Von Grodek et al. | 73—105 |
| 3,242,836 | 3/1966 | Bartsch | 73—105 |
| 3,254,530 | 6/1966 | Ohringer | 73—105 |
| 3,259,989 | 7/1966 | Wilson | 33—174 |
| 3,320,799 | 5/1967 | Goodey | 73—105 |
| 2,956,236 | 10/1960 | Klestadt | 330—123 |
| 2,842,740 | 7/1958 | Sparks | 73—119 |

JAMES J. GILL, Primary Examiner

H. GOLDSTEIN, Assistant Examiner

U.S. Cl. X.R.

73—105; 307—229; 324—119; 329—127